United States Patent [19] [11] 4,395,796
Akaura et al. [45] Aug. 2, 1983

[54] STRAP TIGHTENER

[75] Inventors: Seishiro Akaura; Motohide Kagimura, both of Osaka, Japan

[73] Assignee: Ashimori Industry Co., Ltd., Osaka, Japan

[21] Appl. No.: 285,505

[22] Filed: Jul. 21, 1981

[30] Foreign Application Priority Data

Jul. 25, 1980 [JP] Japan ................... 55/102638

[51] Int. Cl.³ .............................. B66F 3/00
[52] U.S. Cl. ................. 24/68 CD; 24/68 R; 24/69 ST; 24/265 CD; 24/273; 410/103
[58] Field of Search ............... 24/19, 32, 68 R, 68 SB, 24/68 CD, 68 CT, 68 BT, 68 A, 68 C, 69 R, 69 ST, 69 TT, 69 CT, 69 CF, 69 T, 69 TM, 69 TS, 71 SB, 71 TD, 71 CT, 71 SD, 265 R, 265 CD; 410/100, 103; 254/256, 257, 251

[56] References Cited

U.S. PATENT DOCUMENTS 2,710,436 6/1955 Davis ............................ 24/68 CD
2,852,827 9/1958 Arnold ........................... 24/273
2,867,406 1/1959 Davis ............................ 24/68 CD
3,050,799 8/1962 Davis ............................ 24/68 CD
3,099,055 7/1963 Huber ............................ 410/103
4,054,971 10/1977 Kawahara ..................... 24/68 CD

FOREIGN PATENT DOCUMENTS 1316881 5/1973 United Kingdom ........... 24/68 R

Primary Examiner—Paul J. Hirsch
Assistant Examiner—Kris R. Schulze
Attorney, Agent, or Firm—Birch, Stewart, Kolasch & Birch

[57] ABSTRACT

A strap tightener in which a specific releasable tensioning and clasping mechanism for a strap is incorporated to hold heavy loads under tension firmly in a given position. The strap tightener can advantageously be used to tie down cargo containers, motor vehicles and the like heavy loads to fixing structures on carrier vessels or carts. The strap tightener has a simple and economical structure with a reduced number of parts and is thus smoothly operable to attain good strap tensioning without incurring any damage of the strap and any loosening of the tensioned strap during the use.

16 Claims, 10 Drawing Figures

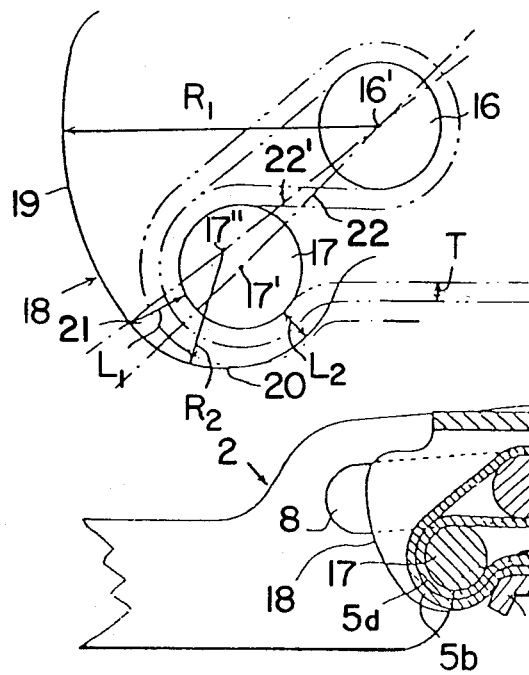
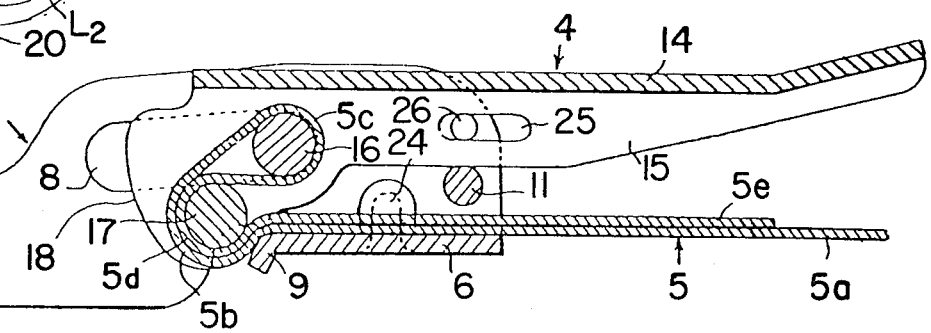
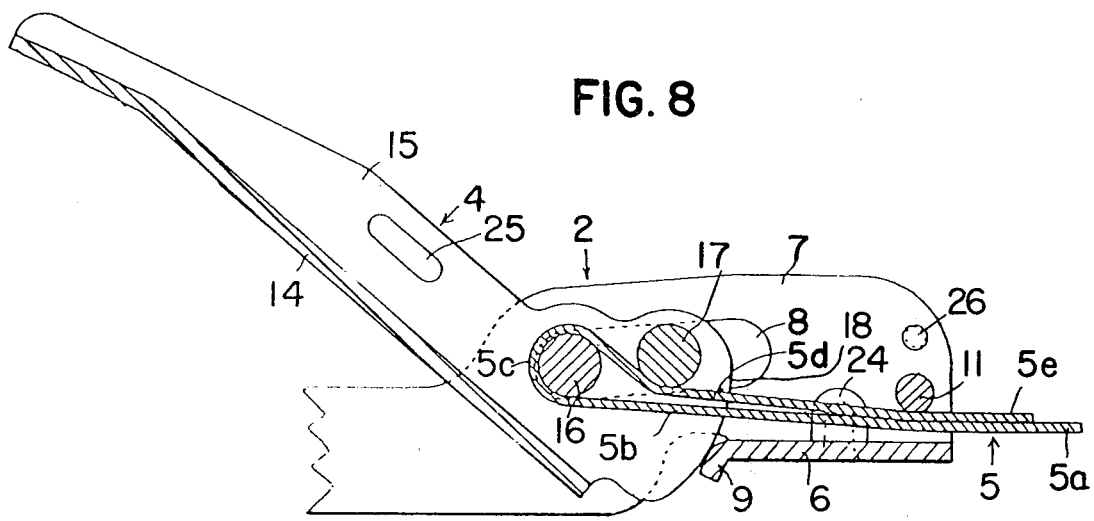

STRAP TIGHTENER

BACKGROUND OF THE INVENTION

1. Field of the Invention

This invention relates to a strap tightener for tightening a strap to hold heavy loads under tension firmly in a given position. More particularly, this invention relates to a strap tightener in which a specific releasable tensioning and clasping mechanism for a flexible strap is incorporated to tie down heavy loads such as cargo containers and motor vehicles to fixing structures equipped, for example, on carrier vessels or carts for preventing arbitrary movement of such heavy loads while they are fastened.

2. Description of the Prior Art:

In the past, a variety of strap tightening or clasping devices were designed for securely holding cargo and the like objects in position with a strap element. However, these known strap tightening devices more or less accompany such disadvantages as unexpected release of tension while the device is being used, damage of strap elements. Further, the prior art devices require complicate mechanism. For example, the strap securing device disclosed in U.S. Pat. No. 2,852,827 comprises a frame 17 consisting of two spaced side plates and a handle 18 provided with a beam 22 and supported on a pivot 19 extending between the side plates to enable pivotal movement of the handle pivotably. A strap 11 enters in the device through the clearance formed below the pivot and extends around and underneath the pivot. When the handle 18 is moved from the open position to the closed or locked position, the mechanism of this device permits the beam to move around the pivot whereby the strap around the beam is squeezed around the pivot in such a manner that the outer strap around the pivot may clasp itself to the inner strap around the pivot. The device of this type is also seen in U.S. Pat. No. 3,099,055 where a strap tensioning device is disclosed which comprises a frame 15 and a handle 20 provided with a strap engaging beam 23 and pivotably supported on a pivot 19 and functions in the same manner as in the above mentioned strap securing device and in U.K. Pat. No. 966,133 where a buckle for connecting a strap to another strap is disclosed which comprises a body affording a pair of side rails 10, a frame 15 corresponding to the handle disclosed in the above mentioned U.S. patent, and a movable anchorage 25 corresponding to the strap engaging beam. The mechanism used in these devices requires a lock means. In the device disclosed in the firstly mentioned U.S. patent, for example, a combination of a latch 28 and a slot 29 is required to engage the handle firmly with the frame when the former is held in the closed position. Otherwise, the handle may be moved to the open or release position. Further, this mechanism has such a shortcoming that when the strap holding down cargo is loosened by shock or the like external force, the clasping force of the outer strap against the inner strap around the pivot is so weakened as to permit slippage of the cargo.

Another example of the known devices is seen in U.S. Pat. No. 2,710,436 where cargo tie-down equipment is disclosed which basically has the same structure as described above except that a toggle lever 27 of this equipment as provided with two beams (a roller pin 32 and a rigid pin 34) and the frame of this equipment is also provided with a cross pin 35. The device of this type succeeds in preventing loosening of the strap holding down cargo but, on the other hand, has such disadvantage wherein the path of the strap running through the pins becomes complicated and a combination of a locking pin and a slot is also required to secure the toggle lever in the closed position.

Further examples of the known devices are seen in U.S. Pat. Nos. 2,867,406; 3,050,799 and 4,054,971. The cargo tie-down equipment disclosed in U.S. Pat. No. 2,867,406 comprises as in the device disclosed in U.S. Pat. No. 2,852,827 a retainer 26 and a lever 20 rotatably supported on a second pin 25 and provided with a cross pin 18 as a beam and is characterized in that the lever is provided on a pivotal support 21 with a yoke 23. As compared with the mechanism used in U.S. Pat. Nos. 2,710,436 or 2,852,827, the mechanism used in this equipment has no need of using a lock means because the force acting in the reverse direction to the strap entering in the equipment is supported by the yoke 23, i.e. the lever 20 in place of the retainer, through the pivotal support 21 and because the force acting on the pivotal support is supported by the lever in the closed position. This mechanism is common to the tiedown buckle disclosed in U.S. Pat. No. 3,050,799 which comprises a buckle frame 13 and a lever 11 rotatably supported on a pin 12 and provided with a cross pin 20 as a beam. The clasping device disclosed in U.S. Pat. No. 4,054,971 comprises, as in the case of the equipment disclosed in U.S. Pat. No. 2,867,406, a body X and a lever means Y rotatably supported on a pin member 20 and provided with a stanchion 21 and is characterized in that the lever means is provided on a pin member 23 with a holder Z. The mechanism used in this device is basically equivalent to that used in the above mentioned cargo tiedown equipment and thus has no need of using a lock means, as the force acting in the reverse direction to the strap entering in the device is supported by the lever means through the pin member 23 and the force acting thereon is supported by the lever means in the closed position. A lock means is quite unnecessary in this mechanism but may be used for precaution as represented by a combination of a turn-button 28 and a handle portion 29 in the cargo tie-down equipment or a combination of a detent hole 26 and a projection 27 in the clasping device. The above equipment and devices have a merit of preventing unexpected release of tension, but are unsatisfactory in other aspects; a smooth operation cannot be expected in these devices and damage of a strap element cannot be prevented to a satisfactory degree. Accordingly, there is still a great demand in the field of transportation for developing a new type strap tightener in which the above mentioned drawbacks are all overcome.

SUMMARY OF THE INVENTION

It is an object of the present invention to provide a new strap tightener which is simple in structure and smoothly operable for tightening and loosening a flexible textile strap.

It is another object of the present invention to provide a new mechanism for strap tensioning which prevents the strap from being slackened or loosened by inadvertent application of an external force thereto.

It is still another object of the present invention to provide a new strap tightener useful as a carlocking device for pure car carriers or as a cargo tiedown device.

Other objects, features and advantages of the present invention will become apparent more fully from the following description.

According to the present invention, there is provided a strap tightener which comprises a body including a pair of spaced parallel side plates, a longitudinally elongated slot formed in each of the side plates and a cam-supporting means laterally bridging the spaced side plates at the lower ends thereof beneath the elongated slots. An operating lever is provided having a pair of spaced parallel side plate members, a first shaft laterally extending through the basal portions of the side plate members and passing through the elongated slots in the side plates of the body in such manner that both ends of the first shaft are engaged in the slots and are slidably movable therein. A second shaft is provided spaced away from and in parallel to the first shaft and connecting the bottom portions of the spaced side plate members. The lower end of each side plate member is provided with a cam means having a first arcuate portion having its center on or near an axis of the first shaft and a second arcuate portion having its center on or near an axis of the second shaft; a strap with one free end and with a hook on the opposite end thereof is introduced into the body and the lever in such manner that the strap is passed underneath the second shaft and around the first shaft and then pulled out from the body and lever through the clearance formed between the second shaft and the introduced strap. The arrangement is such that when the lever is in its release position, the second shaft is positioned ahead of the first shaft to permit the strap to move in either direction and when the lever is moved towards its lock position, the first arcuate portion of the cam means is first brought into sliding contact with the cam-supporting means to allow the lever to move almost pivotally about the center of the first shaft whereby the strap is squeezed downward by the second shaft. The second arcuate portion is then brought into sliding contact with the cam-supporting means to allow the lever to move almost pivotally about the center of the second shaft whereby the first shaft moves along the elongated slots and beyond the second shaft.

BRIEF DESCRIPTION OF THE DRAWINGS

FIG. 6 is a longitudinal section view of another example of the strap tightener of the present invention in which the lever is held in its lock position;

FIG. 7 is an enlarged section view showing the relation between the cam edge and the first and second shafts;

FIG. 8 is a longitudinal section view of the strap tightener shown in FIG. 6 in which the lever is held in its release position;

In these drawings, a strap is introduced into the tightener from the right end of the body. Accordingly, the right end in these drawings is arbitrarily referred to herein as the front end and the left end as the rear end. For facilitating understanding of the invention, the main part alone is shown in these drawings and parts not participating in the specific mechanism of this invention, e.g. the rear end of the body usually equipped with a hook directly or indirectly through a strap, rope or chain and the opposite end of the strap provided with a hook or the like fastener are omitted.

DETAILED DESCRIPTION OF THE INVENTION

The strap used in the strap tightener of this invention is a conventional one, for example, a flexible one made of a textile jacket woven or knitted with natural or synthetic fibers which may be incorporated with any conventional reinforcing material. The strap tightener itself is usually made of steel or equivalent tough metals or alloys.

The present invention can more fully be understood from the following description taken in conjunction with the accompanying drawings.

Figure 1:
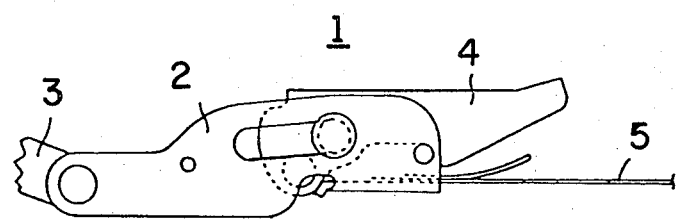
FIG. 1 is a side elevational view of a preferable embodiment of the strap tightener of the present invention in actual use.
Figure 2:
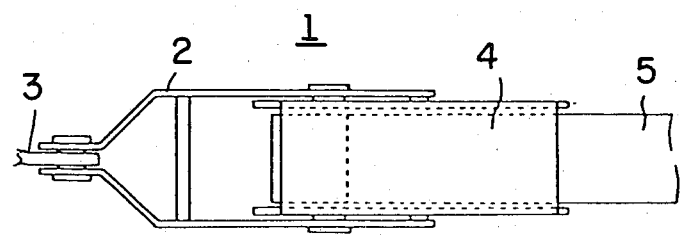
FIG. 2 is a plan view of the strap tightener shown in FIG. 1.

Referring first to FIGS. 1 and 2, there is shown a preferable embodiment of the strap tightener of the present invention in actual use, which is designated therein by a reference numeral 1 and comprises a body 2 provided with a conventional hook means 3 on its rear end, an operating lever 4 pivotally mounted on the body 2 and operable to tighten a strap or belt 5 extending through the tightener 1 and usually provided on its one end with a hook means (not shown).

Figure 3:
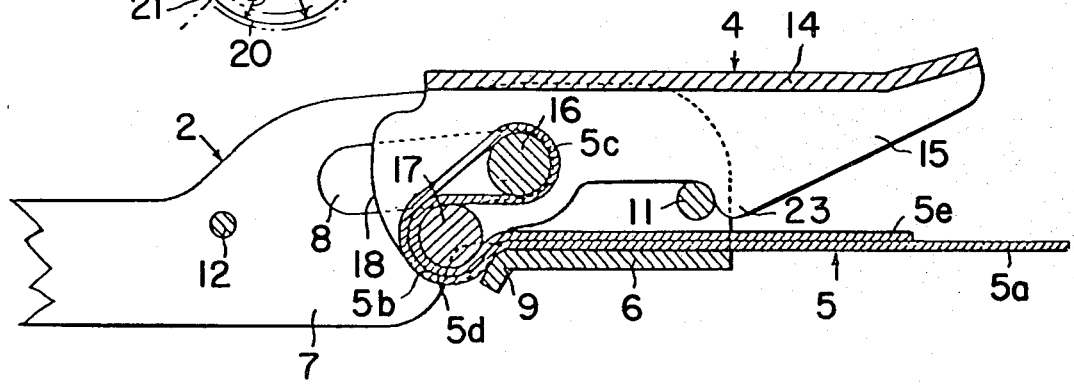
FIG. 3 is a longitudinal section view of an example of the strap tightener of the present invention in which the lever is held in its lock position.

In FIG. 3, the body 2 includes a bottom plate 6, a pair of spaced parallel side plates 7 provided on opposite sides of the bottom plate 6, and a longitudinally elongated slot 8 formed in a central portion of each of the side plates 7 slightly inclined so that its front end is in a position slightly higher than that of its rear end. The bottom plate 6 has such a length that it is fixed only to the front portions of the side plates 7 and the rear end portion of the plate 6 is downwardly bent to form a cam-supporting means 9. If desired, the cam-supporting means 9 may be made separately from the bottom plate 6. The spaced side plates 7 may be reinforced, if necessary, by a supporting shaft 12 or the like bridging member. The operating lever 4 includes a top plate 14 having a free end portion slightly bent upward and a pair of spaced parallel side plate members 15 extending downward on opposite edges of the top plate. The basal portions of the side plate members 15 are provided with a first shaft 16 and a second shaft 17. The second shaft 17 is positioned downwardly to the rear of the first shaft 16. The first shaft 16 extending laterally through the basal portions of the spaced side plate members 15 is pivotally supported and both ends of the shaft are engaged in the longitudinally elongated slots 8 formed in the body 2 and slidably move along the elongated slots 8. Both ends of the shaft 16 may be deformed or provided with a conventional bolt-nut mechanism to prevent its axial movement relative to the side plate members 15. The second shaft 17 is fixed at its both ends to the side plate members 15 and provided on its peripheral surface with knurls.

The intervals between the spaced side plates 7 of the body 2 and between the spaced side plate members 15 of the lever 4 can easily be understood from FIG. 2 showing a plan view of a preferable embodiment of the strap tightener of the present invention. The main part of the lever 4 is encased in the body 2 so that the interval between the spaced side plate members 15 is somewhat smaller than that between the spaced side plates 7 but is large enough as to accommodate the width of the strap 5.

The lower end of each side plate member of the lever 4 is provided with a cam means. Thus, a cam edge 18 is formed on the lower end of each side plate member, the profile of the cam edge 18 being shown in detail in FIG. 4. When the lever 4 is moved from its open or release position to its closed or locked position, the cam edge 18 formed on the lower end of each side plate member moves accordingly while keeping contact with the cam-supporting means 9 of the body 2.

Figure 4:
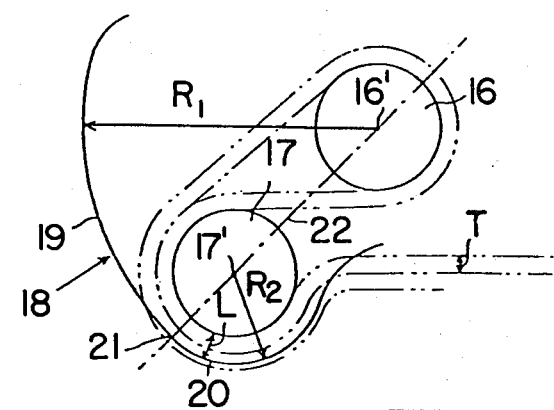
FIG. 4 is an enlarged section view showing the relation between the cam edge and the first and second shafts.

In FIG. 4, the cam edge 18 includes a first arcuate portion 19 having a radius $R_1$ centering on the axis 16' of the first shaft 16, a second arcuate portion 20 having a radius $R_2$ centering on the axis 17' of the second shaft 17 and a point 21 joining the first and second arcuate portions 19 and 20 and lying on a line 22 passing through the axes 16' and 17'. A distance L between the periphery of the second shaft 17 and the second arcuate portion 20 of each cam edge 18 is slightly smaller than two times the thickness T of the strap 5 thereby ensuring that the portions 5b and 5d of the strap are firmly held between the second shaft 17 and the cam-supporting means 9 to prevent any slipping movement of the strap 5 when the lever is held in its lock position. In some cases, however, the distance L may be equal to or larger than 2T.

Figure 5:
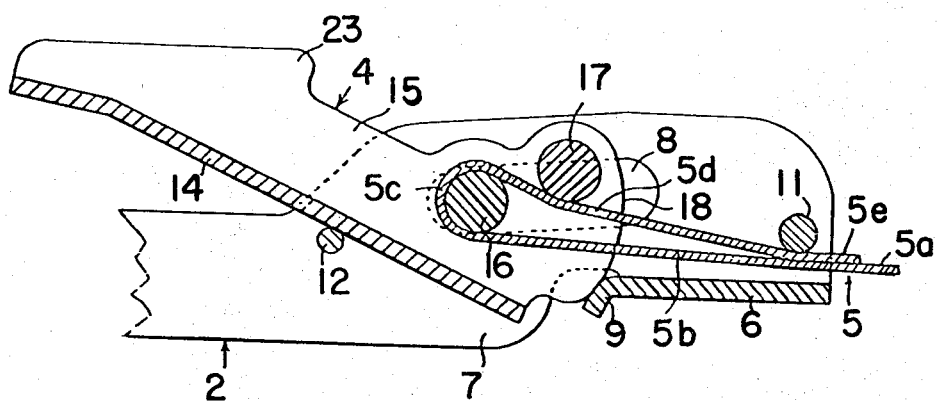
FIG. 5 is a longitudinal section view of the strap tightener shown in FIG. 3 in which the lever is held in its release position.

In FIG. 5 showing the strap tightener not in action, the lever 4 is moved rearly uncovering the lower part thereof. A protuberant portion formed integrally with each side plate member 15 is a detent 23 capable of being engaged with a guide rod 11 laterally extending between the spaced side plates of the body 2 when the lever is held in its locked position. A strap 5 with a free end is introduced into the strap tightener from the front end thereof in such manner that the strap 5 is passed between the bottom plate 6 of the body 2 and the guide rod 11 and then around the periphery of the first shaft 16 and underneath the second shaft 17 and pulled out through the clearance formed between the guide rod 11 and the introduced strap 5. As the second shaft 17 is positioned ahead of the first shaft 16, the strap 5 can easily be introduced into the tightener and pulled out therefrom because the introduced portions 5a and 5b are kept almost straight and the pulled out portions 5d and 5e are also kept substantially straight except that the strap is brought into light contact with the second shaft 17 and the guide rod 11. The strap is curved only in the portion 5c around the periphery of the first shaft 16 so that the strap can be pulled in either direction without any frictional resistance.

In actual use of the strap tightener shown in FIGS. 3 and 5, a hook means fitted directly or indirectly to the rear end of the body 2 is engaged with a fixing structure on a carrier and a hook (not shown) fitted to the opposite end of the strap 5 is also engaged with an object to be anchored or retained or with another fixing structure through the object. The free end 5e of the strap is then pulled to tension the portion 5a in contact with the object whereby the first arcuate portions 19 of the cam edges are brought into contact with the cam-supporting means 9 of the body 2.

When the operating lever 4 is moved to its locked position, the lever as a whole is pivotally moved on the center 16' of the first shaft 16 in the clockwise direction in the drawing whereby the first arcuate portions 19 of the cam edges 18 are slid on the cam-supporting means 9. Accordingly, the second shaft 17 is rotated around the first shaft 16 in the clockwise direction to push down the portions 5b and 5d of the strap whereby the strap is strongly tensioned. When the cam-supporting means 9 brought into sliding contact with the cam edges 18 in the course of further pivotal movement of the lever has passed over the point 21 joining the first arcuate portion 19 and the second arcuate portion 20 of the cam edges 18, the lever 4 is then pivotally moved about the central axis 17' of the second shaft 17 while pushing it down, whereby the first shaft 16 moves forward along the elongated slot 8. At the final stage of the lever action, the first shaft 16 is moved forward beyond the second shaft 17, the second shaft 17 is slightly pulled up to permit a corresponding slight slackening of the strap 5. When the lever is entirely rotated, the detent 23 is engaged with the guide rod 11 to prevent further movement of the lever as shown in FIG. 3. In this case, the portions 5b and 5d of the strap are overlapped with each other around the second shaft to present such a risk that the strap is inadvertently slackened by slipping or becomes incomplete in tensioning. As the lever 4 is pivotally moved to position the first shaft 16 ahead of the second shaft 17, the force acting on the strap 5 is directed to pulling up the second shaft thereby allowing the lever 4 to move pivotally in the clockwise direction around the first shaft. At the final stage of the pivotal movement of the lever 4, therefore, the lever is pivotally moved naturally by the tension of the strap 5 to attain complete tightening of the strap with the result that the lever is not moved back to its open or release position even in the event any unexpected vibration or other external force is applied to the lever. Even if the lever is moved back slightly, the lever will be returned to its lock position to maintain the strap in a highly stably tightened state by the strong tension of the strap.

After the detent 23 has been engaged with the guide rod 11, it is possible to increase the strap-clasping power with the aid of the second shaft 17 and the cam-supporting means 9 by pushing the lever 4 forward.

In FIGS. 6–8 showing another example of the strap tightener of the present invention, the reference numerals 2 and 4–22 have the same meanings as described in FIGS. 3–5. Major differences in structure between the strap tightener shown in FIGS. 6–8 and that shown in FIGS. 3–5 are seen in the positions of the first and second shafts and in the lever-locking device. In FIGS. 6 and 8, a projection 24 is formed at the lower end of each side plate 7 in contact with the edge of the bottom plate 6 and each side plate member 15 is provided in front of the elongated slot 8 with a longitudinally elongated lock slot 25 in which another projection 26 formed inwardly on the inner surface of each side plate 7 can be engaged when the lever is moved to its lock position. On rare occasions, either edge of the strap may jut out from the clearance formed between the cam-supporting means 9 and either of the side plates 7 of the body and result in a possible damage of the strap when it is nipped between the second shaft 17 and the cam-supporting means. The inwardly extending projections 24 formed on the lower ends of both side plates 7 prevents such damage by centering the strap.

In FIG. 7, the center of each second arcuate portions 20 of the cam edges 18 is on an axis 17″ slightly deviating from the axis 17′ of the second shaft 17 so that a point 21 at which the first and second arcuate portions 19 and 20 are joined is on a line 22′ passing through the axis 16′ of the first shaft 16 and the axis 17″ of the second shaft 17. The distance $L_1$ between the joining point 21 and the periphery of the second shaft 17 is larger than two times the thickness T of the strap 5 and becomes gradually smaller as the second arcuate portion 20 departs from the joining point 21. The smallest distance $L_2$ is slightly smaller than 2T. As compared with the example shown in FIG. 4 the distance L is smaller than 2T overall the second arcuate portion 20 so that the edges of the strap is at all times exposed, the example shown in this FIG. 7 the distance L is slightly larger than 2T over the substantial part of the second arcuate 20 portion is improved to prevent the strap from any damage in actual use. With the arrangement as shown in FIG. 7, a frictional resistance of the portion 5b of the strap is extremely reduced between the second shaft and the cam-supporting means. When the strap tightener is in the locked state, the portions 5b and 5d of the strap are firmly held between the second shaft 17 and the cam-supporting means 9 to prevent the strap from being loosened by slipping. In this example, further advantage is attained in that the cam edges 18 and the cam-supporting means 9 are brought into sliding contact with each other without any substantial friction thereby reducing the force for the lever action.

In FIG. 8, each side plate member 15 of the lever 4 is provided with a longitudinally elongated lock slot 25 and each side plate 7 of the body 2 is provided with a projection 26 on the inner surface thereof in place of a lock combination of the detent and the guide rod used in the example shown in FIG. 5. When the lever is moved to its lock position, the projection is engaged in the elongated lock slot to prevent any reverse movement of the lever.

In actual use of the strap tightener shown in FIGS. 6 and 8, hook means fitted to the tightener and the opposite end of the strap are engaged with the fixing structures in the manner as described in the example shown in FIGS. 3 and 5. When the operating lever 4 is moved to its lock position, the second shaft 17 is rotated around the first shaft 16 in the same manner as described in the example shown in FIGS. 3 and 5 thereby pushing down the portions 5b and 5d of the strap. As the cam edges are brought into smooth sliding contact with the cam-supporting, the force required for moving the lever is weakened and at the same time the strap is prevented from any damage.

Figure 9:
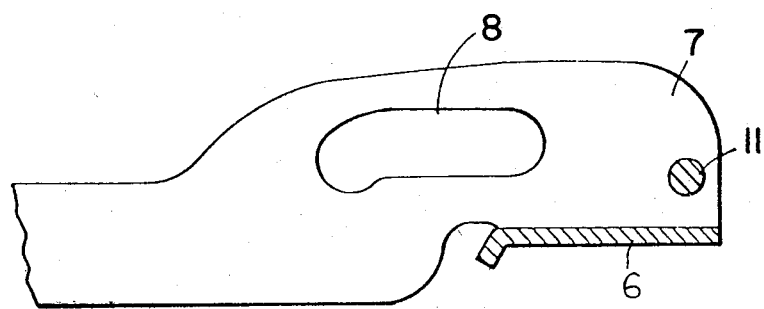
FIG. 9 is a longitudinal section view showing the shape of another example of the longitudinally elongated slot formed in the body.

In FIG. 9, the reference numerals 6-8 and 11 have the same meanings as given in FIG. 8. In this embodiment, the longitudinally elongated slot 8 is curved downward at the rear end.

Figure 10:
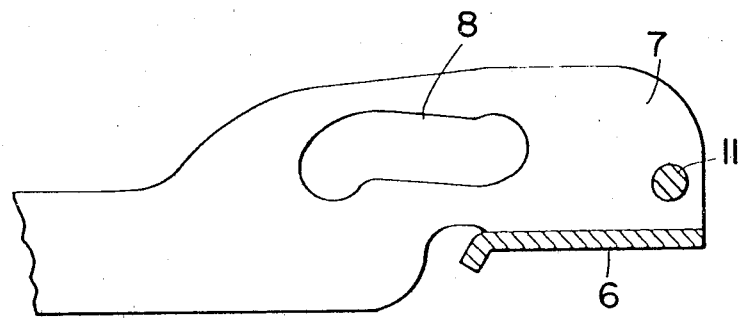
FIG. 10 is a longitudinal section view showing the shape of still another example of the longitudinally elongated slot formed in the body.

In FIG. 10, the reference numerals 6-8 and 11 have also the same meanings as given in FIG. 8. In this embodiment, the longitudinally elongated slot 8 is curved upward and downward at both ends.

These embodiments show modifications in the shape of the slot 8 which is usually formed horizontally or with a slight angle so that the front end may become somewhat higher. As compared with the horizontally extending slot, a slightly inclined slot as shown in FIGS. 3 and 6 is advantageous in that the lever can be operated even with a weakened force. In addition, the distance between the axis of the first shaft 16 and the intersecting point of the longitudinal axis of the slot and a line from the axis of the second shaft at right angle relative to the longitudinal axis of the slot becomes larger so that inadvertent unlocking of the lever can be prevented. Such advantages can maximally be exhibited by the embodiment shown in FIG. 9 or 10.

With the arrangement described above, the present invention provides a strap tightener of a very simple and economical structure with a reduced number of parts. Moreover, high tension can be applied to the strap while strongly clasping the strap. In actual use, such tension can be maintained even when a vibrating or other external force is applied to the strap. When the lever is held in its lock position, the tension applied to the strap is directed to allowing the lever to move pivotally towards its lock position so that the lever can never be released inadvertently and the operation of the lever is very easy and does not require any skill.

The bottom plate 6 and the top plate 14 may not be integral with the side plates 7 and the side plate members 15, respectively. For example, the spaced side plates may be fixed to each other by using a connecting rod or a spacer member in place of the bottom plate 6.

The centers of the first arcuate portions 19 of the cam edges 18 may deviate from the axis 16′ of the first shaft 16. The profile of the cam edges may not mean geometrically exact circular arcs in a strict sense and may only be sufficient to bring forth the function of pivotally moving the operation lever 4 about an axis on or near the axis of the first shaft at the initial stage of the pivotal movement and about an axis on or near the axis of the second shaft at the final stage of the pivotal movement. The first shaft 16 may be fixed to the operating lever 4 but is preferably pivotally movable in view of operability. The second shaft in the example shown in FIGS. 6 and 8 may preferably be provided on its peripherial surface with serrations, as in the examples shown in FIGS. 3 and 5, to prevent the strap from slipping.

Under the condition that the operating lever 4 has been held in its lock position, the lock mechanism for the body 2 and the lever 4, i.e. a combination of the guide rod 11 and the detent 23 or a combination of the lock slot 25 and the projection 26 is not indispensable. However, the use of such lock mechanism is recommendable to prevent shaking of the tightener not in use or to confirm the completion of the tightening operation. The guide rod 11 is also not essential but is preferably used to prevent inclination of the tightener at the time of pivotally moving the lever to its lock position.

As shown in FIGS. 1, 3, 5, 6 and 8, each of the side plates 7 of the body 2 is so shaped that when the lever 4 is held in its lock position, the lower end portion of the side plate in rear of the cam-supporting means 9 is low enough to cover the portion 5b of the strap thereby protecting the strap from damage caused by contact with external structures.

It is furthermore to be construed that the present invention is not limited or restricted to the embodiments described hereinbefore and any modification, alteration and substitution can be made within the scope of the appended claims.

What is claimed is:

1. A strap tightener which comprises:
a body including a pair of spaced parallel side plates, a longitudinally elongated slot formed in each of the side plates and a cam-supporting means laterally bridging the spaced side plates at the lower ends thereof beneath the elongated slots, and an operating lever having a pair of spaced parallel side plate members, a first shaft laterally extending through the basal portions of the side plate members and passing through the elongated slots in the side plates of the body in such manner that both ends of the first shaft are engaged in the slots and are slidably movable therein, and a second shaft spaced away from and in parallel to the first shaft and connecting the bottom portions of the spaced side plate members, the lower end of each side plate member being provided with a cam means having a first arcuate portion having its center on or near an axis of the first shaft and a second arcuate portion having its center on or near an axis of the second shaft;

a strap with one free end and with a hook on the opposite end thereof being introduced into the body and the lever in such manner that the strap is passed underneath the second shaft and around the first shaft and then pulled out from the body and the lever through the clearance formed between the second shaft and the introduced strap;

and the arrangement being such that when the lever is in its release position, the second shaft is positioned ahead of the first shaft to permit the strap to move in either direction and that when the lever is moved towards its lock position, the first arcuate portion of the cam means is first brought into sliding contact with the cam-supporting means to allow the lever to move almost pivotally about the center of the first shaft whereby the strap is squeezed downward by the second shaft, and the second arcuate portion is then brought into sliding contact with the cam-supporting means to allow the lever to move almost pivotally about the center of the second shaft whereby the first shaft moves along the elongated slots and beyond the second shaft.

2. A strap tightener according to claim 1, wherein the body further comprises a bottom plate connecting the spaced parallel side plates and the rear end of the bottom plate is bent downward to form the cam-supporting means.

3. A strap tightener according to claim 1, wherein each of the elongated slots is inclined so that its front end is positioned higher than its rear end.

4. A strap tightener according to claim 1, wherein the body is provided with a guide rod laterally extending between the front end portions of the spaced side plates and the strap with one free end is introduced below the guide rod and pulled out through the clearance formed between the guide rod and the introduced strap.

5. A strap tightener according to claim 1, wherein the body is provided on each of the spaced side plates with an inwardly facing projection for centering the introduced strap.

6. A strap tightener according to claim 4, wherein the operating lever is shaped on the central lower end of each of the spaced side plate members to form a detent capable of engaging itself with the guide rod when the lever is held in the lock position.

7. A strap tightener according to claim 1, wherein the interval between the spaced parallel side plate members is so large as to accommodate the width of the strap.

8. A strap tightener according to claim 1, wherein the spaced parallel side plates are combined together at the rear ends thereof and a hook is fitted directly or indirectly through a strap or rope-like element to the rear end.

9. A strap tightener according to claim 1, wherein the cam-supporting means is located in such position that it may be brought into contact with the cam means on the lower end of the operating lever when the lever is moved to the lock position, whereby the introduced and pulled straps are squeezed between the cam-supporting means and the second shaft.

10. A strap tightener according to claim 1, wherein facing projections are formed on the inner surfaces of the spaced side plates and longitudinally elongated lock slots are formed in the spaced side plate members of the operating lever, the projections being engaged with the lock slots when the lever is held in its lock position.

11. A strap tightener according to claim 1, wherein the center of each of the second arcuate portions of the cam means formed on the lower ends of the spaced side plate members is on the axis of the second shaft and the distance between the periphery of the second shaft and the second arcuate portion is slightly smaller than two times of the thickness of the strap.

12. A strap tightener according to claim 1, wherein each of the second arcuate portions of the cam means formed on the lower ends of the spaced side plate members deviates from the axis of the second shaft so that the distance between the periphery of the second shaft and the second arcuate portion is largest at the joining point of the first and second arcuate portions and gradually becomes smaller as the second arcuate portion departs from the joining point.

13. A strap tightener according to claim 12, wherein the distance between the cam means and the periphery of the second shaft at the joining point of the first and second arcuate portions of the strap is larger than two times the thickness and the minimum distance between the second arcuate portion and the periphery of the second shaft is smaller than two times the thickness of the strap.

14. A strap tightener according to claim 1, wherein the first shaft is rotatably supported relative to the body and the operating lever.

15. A strap tightener according to claim 1, wherein the peripheral surface of the second shaft is provided with knurls.

16. A strap tightener according to claim 1, wherein the lower ends of the side plates of the body in rear of the cam-supporting means are lower than the strap in the lowest position which is wound around the second shaft under the condition that the operating lever has been held in its lock position.

* * * * *